United States Patent
Knoeppel et al.

(10) Patent No.: US 7,046,822 B1
(45) Date of Patent: May 16, 2006

(54) METHOD OF DETECTING OBJECTS WITHIN A WIDE RANGE OF A ROAD VEHICLE

(75) Inventors: Carsten Knoeppel, Stuttgart (DE); Uwe Regensburger, Ostfildern (DE)

(73) Assignee: DaimlerChrysler AG, Stuttgart (DE)

( * ) Notice: Subject to any disclaimer, the term of this patent is extended or adjusted under 35 U.S.C. 154(b) by 775 days.

(21) Appl. No.: 10/009,596

(22) PCT Filed: Jun. 9, 2000

(86) PCT No.: PCT/EP00/05337

§ 371 (c)(1),
(2), (4) Date: May 6, 2002

(87) PCT Pub. No.: WO00/77736

PCT Pub. Date: Dec. 21, 2000

(30) Foreign Application Priority Data

Jun. 11, 1999 (DE) ................................ 199 26 559

(51) Int. Cl.
*G06K 9/00* (2006.01)

(52) U.S. Cl. ....................... 382/103; 701/210; 348/169

(58) Field of Classification Search ................ 382/100, 382/103; 701/210; 348/169
See application file for complete search history.

(56) References Cited

U.S. PATENT DOCUMENTS

| 5,410,346 | A | * | 4/1995 | Saneyoshi et al. | 348/116 |
|---|---|---|---|---|---|
| 5,642,093 | A | * | 6/1997 | Kinoshita et al. | 340/439 |
| 5,809,161 | A | * | 9/1998 | Auty et al. | 382/104 |
| 5,937,079 | A | * | 8/1999 | Franke | 382/103 |
| 6,122,597 | A | * | 9/2000 | Saneyoshi et al. | 701/301 |
| 6,169,572 | B1 | * | 1/2001 | Sogawa | 348/113 |
| 2001/0036293 | A1 | * | 11/2001 | Laumeyer et al. | 382/104 |
| 2003/0099377 | A1 | * | 5/2003 | Hanawa | 382/104 |
| 2004/0062442 | A1 | * | 4/2004 | Laumeyer et al. | 382/190 |

FOREIGN PATENT DOCUMENTS

| DE | 43 08 776 C2 | 9/1993 |
|---|---|---|
| DE | 42 11 171 A1 | 10/1993 |
| EP | 0 558 027 B1 | 9/1993 |
| EP | 0 874 331 A2 | 10/1998 |
| GB | 0874331 A2 * | 10/1998 |

* cited by examiner

*Primary Examiner*—Samir Ahmed
*Assistant Examiner*—Anand Bhatnagar
(74) *Attorney, Agent, or Firm*—Crowell & Moring LLP

(57) ABSTRACT

The invention relates to a method of detecting objects within a wide range of a road vehicle. According to said method, the distance between a moving or stationary vehicle and one or more objects is calculated by distance-based image segmentation using stereoscopic image processing techniques and the properties of the detected objects are determined by object recognition in the segmented image areas. Image areas of three-dimensional and/or flat objects are detected and said three-dimensional and/or flat objects are detected by clustering 3D pixels according to defined criteria. Three-dimensional objects are determined by features with similar distance values and flat objects by features with similar height values.

9 Claims, 6 Drawing Sheets

METHOD OF DETECTING OBJECTS WITHIN A WIDE RANGE OF A ROAD VEHICLE

BACKGROUND AND SUMMARY OF THE INVENTION

The invention relates to a method of detecting objects in the vicinity of a road vehicle up to a considerable distance, in which the distance from a moving or stationary vehicle to one or more objects is calculated by distance-based image segmentation using stereo image processing, and characteristics of the detected objects are determined by object recognition in the segmented image regions. Image regions of elevated objects and/or flat objects are determined and the elevated objects and/or flat objects are detected by combining (clustering) 3D points in accordance with predetermined criteria. The elevated objects are determined through features with similar distance values and the flat objects are determined through features with similar height values. The relevant objects are followed over time (tracking) and their distance and lateral position relative to the particular vehicle is determined in order to assess the dynamic behavior of the relevant objects.

In order to assist the driver of a motor vehicle in road traffic, driver assistance systems have been developed, which are suitable for detecting situations in the road traffic which are anticipated to be hazardous. Such driver assistance systems can either warn the driver, on the basis of his behavior, or intervene in the management of the vehicle. The intention here is to increase driving safety, to relieve the driver of monotonous driving tasks and, therefore, for driving to become more convenient.

On account of the high requirements on the reliability of systems which increase safety, at the current time, it is predominantly convenience systems which are available on the market. Examples of this are parking aids and intelligent cruise control systems. Driver assistance systems which increase safety are intended to register the surrounding traffic situation to an ever increasing extent and to take it into account.

EP 0 558 027 B1 discloses a device for registering the distance between vehicles. In the case of this device, a pair of image sensors generates an image of an object, which is displayed to the driver. One region of this image is subdivided into windows. The distances from the driving vehicle to the object, which is located in the respective window, are registered. In this case, the distances are calculated by comparing two items of image information recorded by different image sensors in different windows. On the basis of the determined distance information, the respective object is determined. A grid which divides the relevant image region is used. The grid surrounds the object to be registered and supplies further image information. The symmetry of this image information is determined, and the existence of a vehicle travelling in front is predicted by determining a level of stability of a horizontal movement of a line of symmetry and a second level of stability of the distances over time.

This known registration device is used for the purpose of registering and recognizing vehicles located in front of the moving vehicle. The reliable recognition of objects is achieved only in the near region, however, since there the simple registration of lines of symmetry can be carried out with sufficient stability. In the remote region, this simple registration of symmetry is no longer adequate on its own because of the low resolution in the image and the resulting inaccuracy in the determination of the object.

However, high requirements have to be placed on reliable object recognition in particular, in order that the driver is not given any erroneous information, which can lead to erroneous and hazardous reactions. In the case of intelligent systems, the vehicle itself could react in a manner presenting a traffic hazard, on the basis of the erroneous information. Reliable information is imperative, for example in accurate-lane recognition of vehicles at a considerable distance, both in and counter to the actual direction of travel.

For the recognition of interesting patterns, DE 42 11 171 A1 proposes a method which applies the cross relation of small singular extracts from the entire pattern of interest by means of block-by-block progressive image recognition via a trained classification network.

DE 43 08 776 C2 discloses a device for monitoring the outer space around a vehicle, which is travelling over one lane on a road. The lane is defined by extended white lines. By means of image processing, the course of the road is determined by using three-dimensional position information from sections of the white lines. By utilizing the three-dimensional position information from the white lines, the white lines are separated from three-dimensional objects. For each section, the vertical extent of possible objects is determined. As a result, the coordinates for three-dimensional objects of interest, such as motor vehicles, motor cycles or pedestrians, can be defined in the coordinate system of the vehicle. In addition, it is possible to determine which object is concerned.

The procedure described in DE 43 08 776 C2 for monitoring the outer space around a vehicle requires a great deal of computation. It is always necessary to determine the course of the registered region of the road, in order to be able to determine the position of objects in this road course. Since only a limited amount of computing power is available in a motor vehicle, such a monitoring device is ill-suited to practical use. In addition, the known monitoring device is always referred to the presence of white boundary lines, which may not be found on the course of all roads.

EP-A-0 874 331 discloses the practice of dividing up a distance image into regions in the lateral direction away from the vehicle. In this case, a histogram relating to the distance values in the individual regions is drawn up, in order to determine the distances of individual objects from these histograms. The possibility of a collision or contact with objects or other vehicles on the roadway is determined from the position and size of the objects or vehicles. The relative speed of the objects in relation to the particular vehicle is determined by tracking the objects. A reliable statement relating to the relevance of the objects to the situation is possible only after a very computationally intensive procedure, which calls a practical application in road vehicles into question.

The object of the invention is to specify a method of detecting objects in the vicinity of a road vehicle up to a considerable distance which permits the reliable registration of objects, in particular of vehicles in front of and/or behind the road vehicle and their relevance to the situation on the basis of its position relative to the road vehicle.

According to the invention, this object is achieved by determining for the purpose of object recognition, object hypotheses, which are verified by comparison with object models. Segmented image regions are scanned in accordance with predetermined, statistically verified 2D features of the objects to be recognized. The detected objects are compared by using a neural network for the classification of a specific object type. The subclaims relate to advantageous developments of the subject of the invention.

Accordingly, a method of detecting objects in the vicinity of a road vehicle up to a considerable distance is provided, in which the distance from a moving or stationary vehicle to one or more objects is calculated by distance-based image segmentation by means of stereo image processing, and characteristics of the detected objects are determined by object recognition in the segmented image regions.

Determining the characteristics of the detected objects is intended to serve to clarify their relevance to the particular vehicle and therefore contribute to the understanding of the situation.

The detection can preferably be carried out to the front or to the rear and employed, for example, to warn of traffic jams, for distance control from the vehicle in front or for monitoring the rear space. In this case, an important point of view is that the relevance to the situation or the potential hazard of the detected objects is determined from their distance to the particular vehicle and the determined relative speed.

Instead of evaluating pairs of stereo images, which are recorded by a stereo arrangement comprising optical sensors or cameras, in principle, even individually recorded images of different origin can be evaluated in order to determine the distance.

Image regions of elevated objects and/or flat objects are determined. Elevated objects and/or flat objects are detected by combining 3D points in accordance with predetermined criteria. Combining is also designated clustering. In this case, the elevated objects are determined through features with similar distance values and flat objects are determined through features with similar height values. By means of this procedure, objects can be recognized and assessed not only reliably with regard to their distance but also with regard to specific features. Distinguishing between elevated and flat objects is therefore easily possible.

Features of similar distance values and/or similar height are combined in order to form clusters. This distinction between elevated and flat objects is very important for reliable object recognition, for example the recognition of other motor vehicles, and the distinction from road markings. Since appropriately high computing powers can be implemented nowadays in modern motor vehicles, image segmentation of this type by means of distance determination and clustering can be carried out reliably and quickly.

The relevant objects are followed over time and their distance and lateral position relative to the particular vehicle are determined, in order to assess the dynamic behavior of the relevant objects. Only with knowledge of the dynamic behavior of the determined objects are practical reactions of the driver or of the vehicle possible. An "anticipatory" mode of driving is therefore promoted.

Furthermore, by means of this tracking, as it is known, phantom objects which occur sporadically can be suppressed, and the entire recognition performance can be increased. In this way, the number of extracted image regions to be classified in the image can be reduced, if these are checked for their local consistency by means of simple time tracking. By means of tracking the detected objects over time, the object characteristics, such as the distance, relative speed and relative acceleration, can be freed of measurement noise, for example by using a Kalman filter.

For the purpose of object recognition, object hypotheses are determined, which are verified by comparison with object models.

In this way, for the purpose of object recognition, the segmented image regions may be scanned in accordance with predetermined, statistically verified 2D features of the objects to be recognized, and the detected objects may be compared by using a neural network for the classification of a specific object type. In this way, reliable object recognition is carried out.

The detected elevated objects may be, in particular, road vehicles, signposts, bridge columns, lamp posts and so on, whereas the detected flat objects may be, in particular, road markings and boundaries such as curb stones, crash barriers and so on. In this way, for example, the position of a road vehicle on a specific road lane can be determined in a simple way.

In addition, it is advantageous to know the relative position and the relative speed of the detected objects relative to one another and to the moving vehicle, in order to determine the relevance of the detected objects to the situation. To this end, the distance measurement is evaluated, and an accurate road-lane object association is determined.

During the image segmentation, one of the recorded pairs of stereo images can be scanned for significant features of objects to be registered. The spacing of the significant features may then be determined by means of cross-relation by comparing the respective features in a stereo image from the pair of stereo images with the same, corresponding features in the other stereo image from the pair of stereo images, recorded at the same time. The disparities which occur are evaluated.

By determining the spacing of significant features in the pixel range, 3D points in the real world are determined relative to the coordinate system of the measuring device. The information obtained in this way from 3D points is therefore determined from different objects, such as vehicles, road markings, crash barriers, and so on.

In addition to the above-described stereo-based approach, in principle object registration methods based on radar and/or infrared signals in the remote range are also possible.

BRIEF DESCRIPTION OF THE DRAWINGS

Further advantages, features and details of the invention become clearer by using the following description in conjunction with the appended drawings, in which.

DETAILED DESCRIPTION OF THE DRAWINGS

Figure 1:
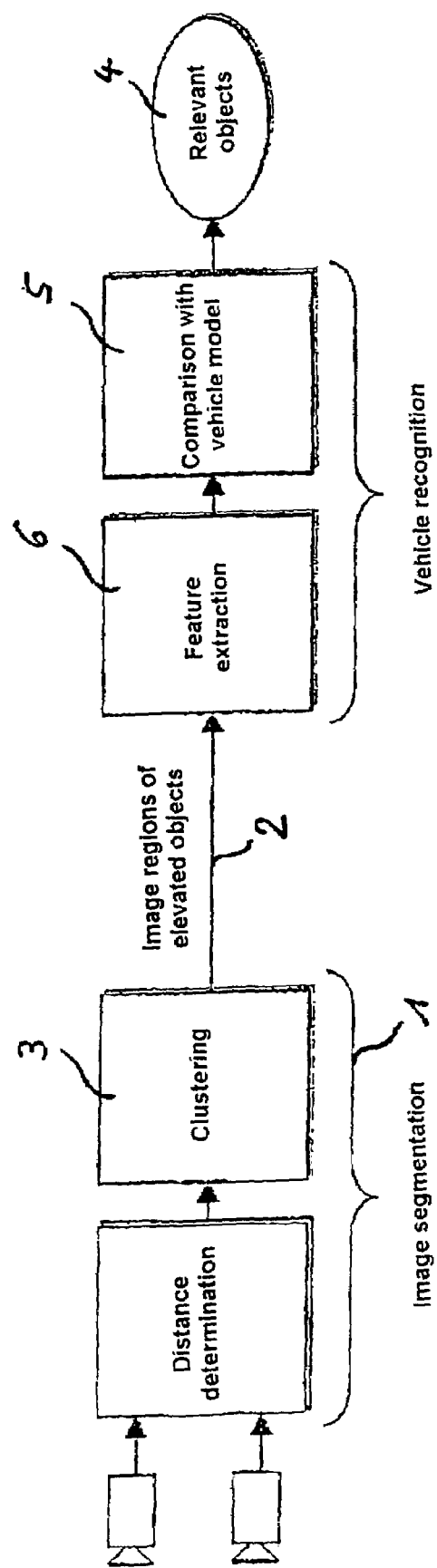
FIG. 1 shows a schematic representation of the method steps according to the invention.

In the following text, the image segmentation 1 by means of stereo image processing is described, during which elevated objects 2 are detected. This is carried out through clustering 3 individual features with similar distances. Then, a vehicle recognition method 5, 6 will be presented, with which road vehicles in the segmented image regions are recognized. For this purpose, features typical of vehicles are extracted 6 and then compared with the internal vehicle model depiction 5 from a neural network 8. The basic procedure is shown schematically in FIG. 1.

Mono image processing is in principle also possible, given the use of similar means and a similar procedure.

The characteristic that road vehicles are elevated by comparison with the road is used for the method of image segmentation presented here. To this end, use is made of a stereo camera system, with which it is possible to determine the distances of significant features which occur in the camera image on road vehicles. By means of this information, a statement about elevated objects 4 is possible. The continually increasing computing power, which is available in the vehicle nowadays, permits real-time analysis of pairs of stereo images.

It is also possible to determine reliably on which lane a registered road vehicle is located. It is then possible to make a statement about the relevance of this registered road vehicle to the situation, on the basis of its position relative to the particular vehicle. The driver and/or the particular vehicle can then react accordingly.

Although radar systems suitable for vehicles do not offer adequate lateral resolution for lane association, infrared systems have resolution and range problems and ultrasound can generally be used for the near range, it is in principle conceivable to employ these systems instead of or in combination with stereo camera systems.

Figure 2:
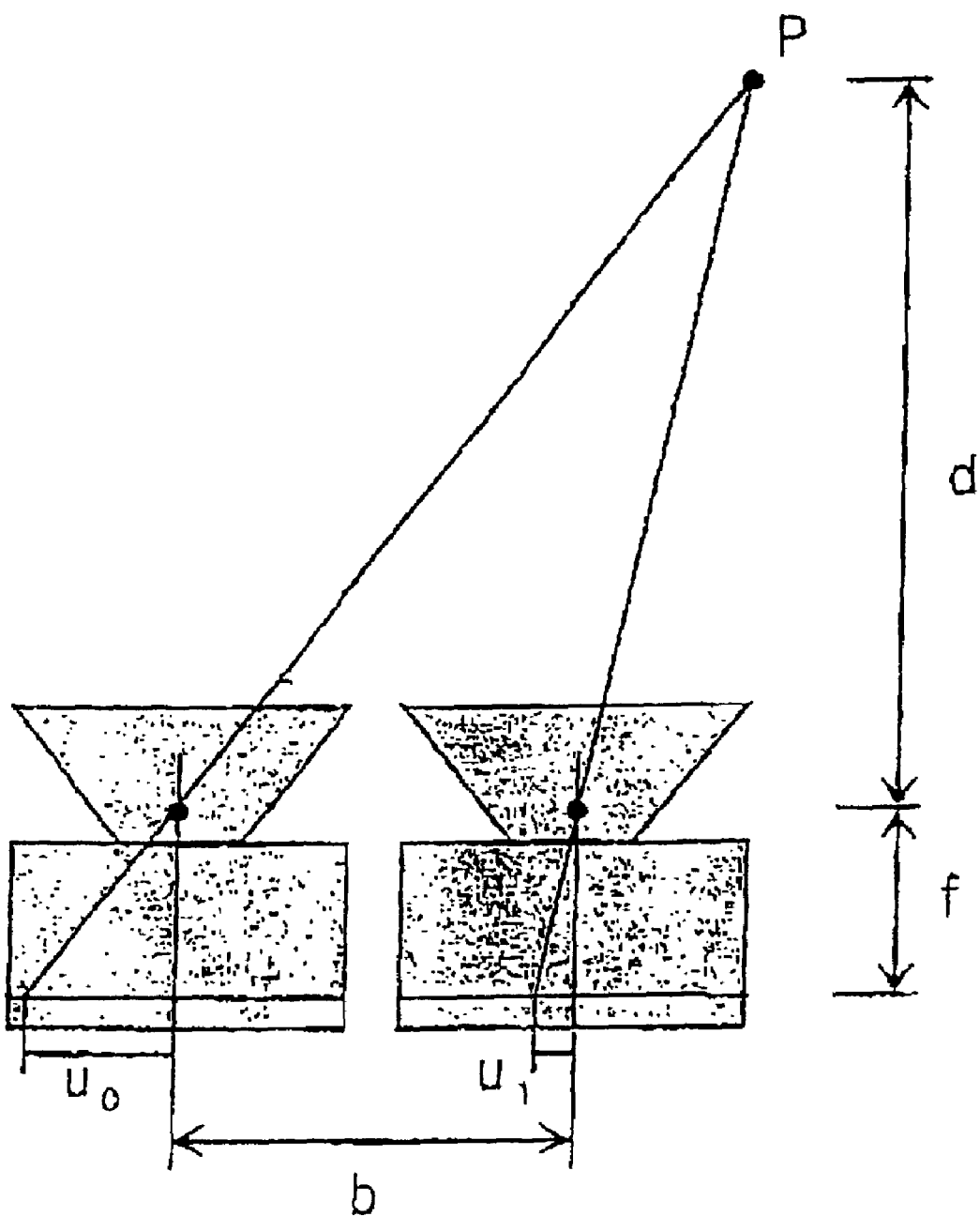
FIG. 2 shows a schematic representation to clarify the principle of the distance determination in the case of cameras with the same focal length arranged in parallel.

The principle of distance determination in the case of the parallel camera arrangement used is represented in FIG. 2 on the basis of the pinhole camera model. The point P in the world (camera's field of view) is projected onto the sensor surfaces of each camera via the projection centers. $u_0$ and $u_1$ represent the deviation from the projection center. Their difference $$\Delta u = u_0 - u_1$$

is designated the disparity $\Delta u$. By means of trigonometry and the sizes of the camera arrangement (focal length f and base width b), the distance d can be calculated.

$$d = \frac{f \cdot b}{\Delta u}$$

Here, b represents the base width, f the focal length and d the distance to the point P. $u_0$ and $u_1$ are the distances of the projections of the point P onto the sensor surface.

In the first processing step in the image segmentation, a search for significant features is carried out in one of the pairs of stereo images. A corresponding display (not shown) on a monitor or another display device may be provided only for research purposes. Significant features are supplied, for example, by edges, which occur reliably in the case of road vehicles. The locations of the selected edges, which define the image region to be correlated in the second processing step may be marked, for example, by means of rectangular frames in the monitor display.

Figure 3:
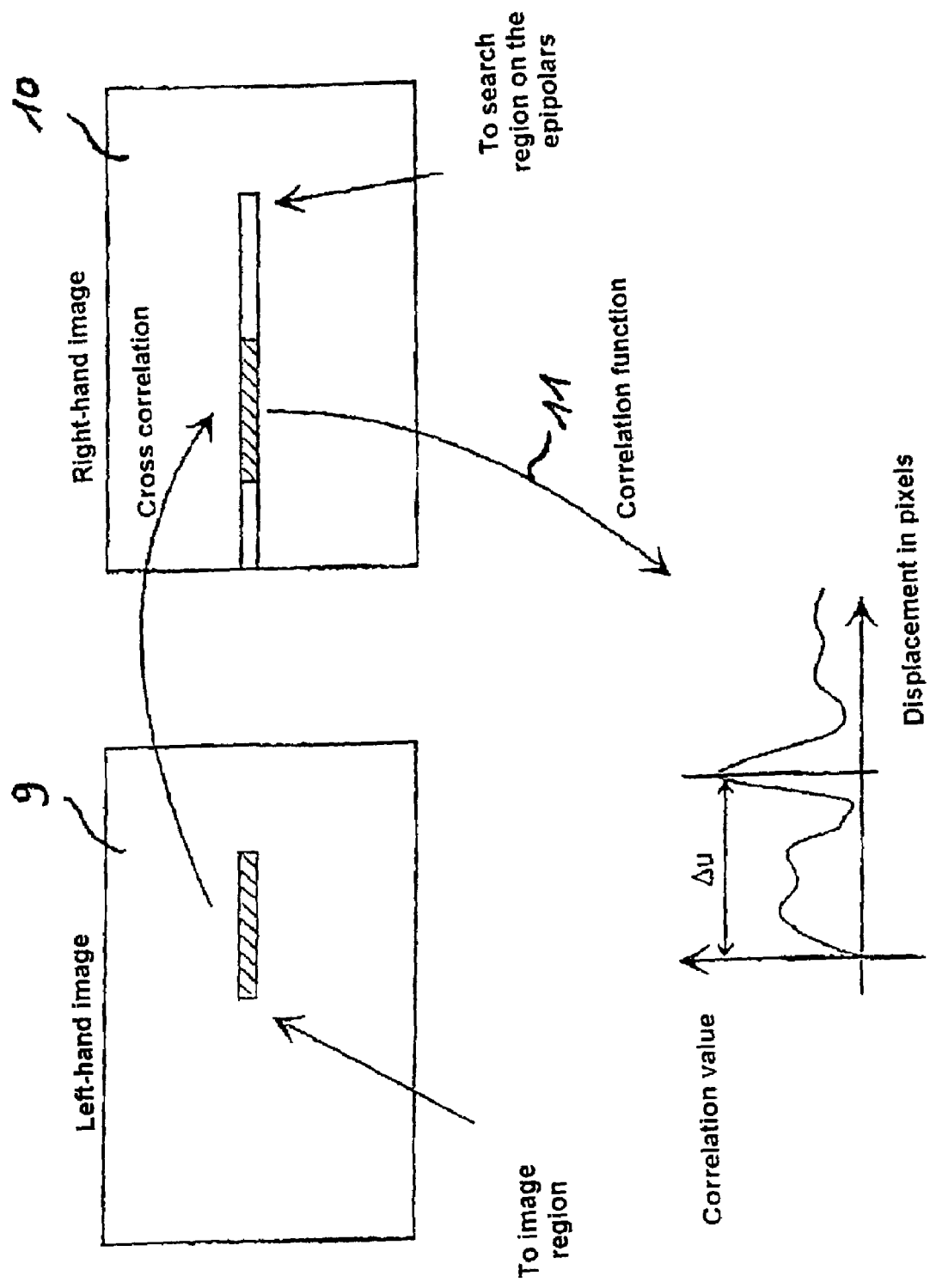
FIG. 3 shows a schematic representation to clarify the principle of the correspondence search by means of cross correlation.

In order to determine the spacing of the features displayed on the monitor, the respective disparities are determined by comparison with the second stereo image recorded at the same time. To this end, a search is made in each rectangular image region by means of cross correlation in the corresponding image. FIG. 3 shows a schematic representation to clarify the principle of the correspondence search by means of cross correlation 11.

On account of the parallel alignment of the cameras, the search region in the vertical direction may be restricted to the epipolars, the respective line in the case shown in FIG. 3. In the horizontal direction, the corresponding search region is defined in the corresponding image 9, 10 in accordance with permissible disparities.

By means of using KKFMF (the local, average-free, normalized cross correlation function) as the correlation function, lightness differences in the pairs of images 9, 10, which occur for example as a result of different solar radiation or different control of the cameras, have only a slight effect on the correlation value.

The correlation coefficient from the KKFMF is calculated as follows:

$$KKFMF(x,y) = \frac{\sum_{j=0}^{n-1}\sum_{i=0}^{m-1}(\overline{F(i,j)} \cdot \overline{P_r(x+i,y+j)})}{\sqrt{\sum_{j=0}^{n-1}\sum_{i=0}^{m-1}\overline{F(i,j)}^2 \cdot \sum_{j=0}^{n-1}\sum_{i=0}^{m-1}\overline{P_r(x+i,y+j)}^2}}$$

The values $\overline{F(i,j)}$ and $\overline{P_r(x+i,y+j)}$ represent the average-free grey values from the rectangular image regions F(i,j) and $P_r(x+i,y+j)$. Because of the normalization, the results from the KKFMF move within the interval [−1, 1]. The value 1 represents agreement in pairs, −1 represents correspondingly inverse agreement.

In the last processing step in the image segmentation, combining (cluster formation) of features with similar distance values takes place (cf. FIG. 1). The relative height of the clusters formed is compared with a fixed minimum height, in order to ensure an elevated object 2. In this case, elevated objects are determined through features with similar distance values, and flat objects are determined through features with similar height values.

For research purposes, the resulting clusters can be inserted as frames into a (not shown) real monitor display of the observed scene. In addition, the distances belonging to the segmented image regions may be specified in numerical values on the frames.

In addition to vehicles, other elevated objects, such as sign posts and road margins, are also segmented. In order to discard erroneous object hypotheses, the stereo-based object segmentation process within the detected image regions is followed by 2D object recognition.

In the following text, the 2D feature extraction and the vehicle recognition will now be described. These processing steps are likewise shown in FIG. 1.

Figure 4:
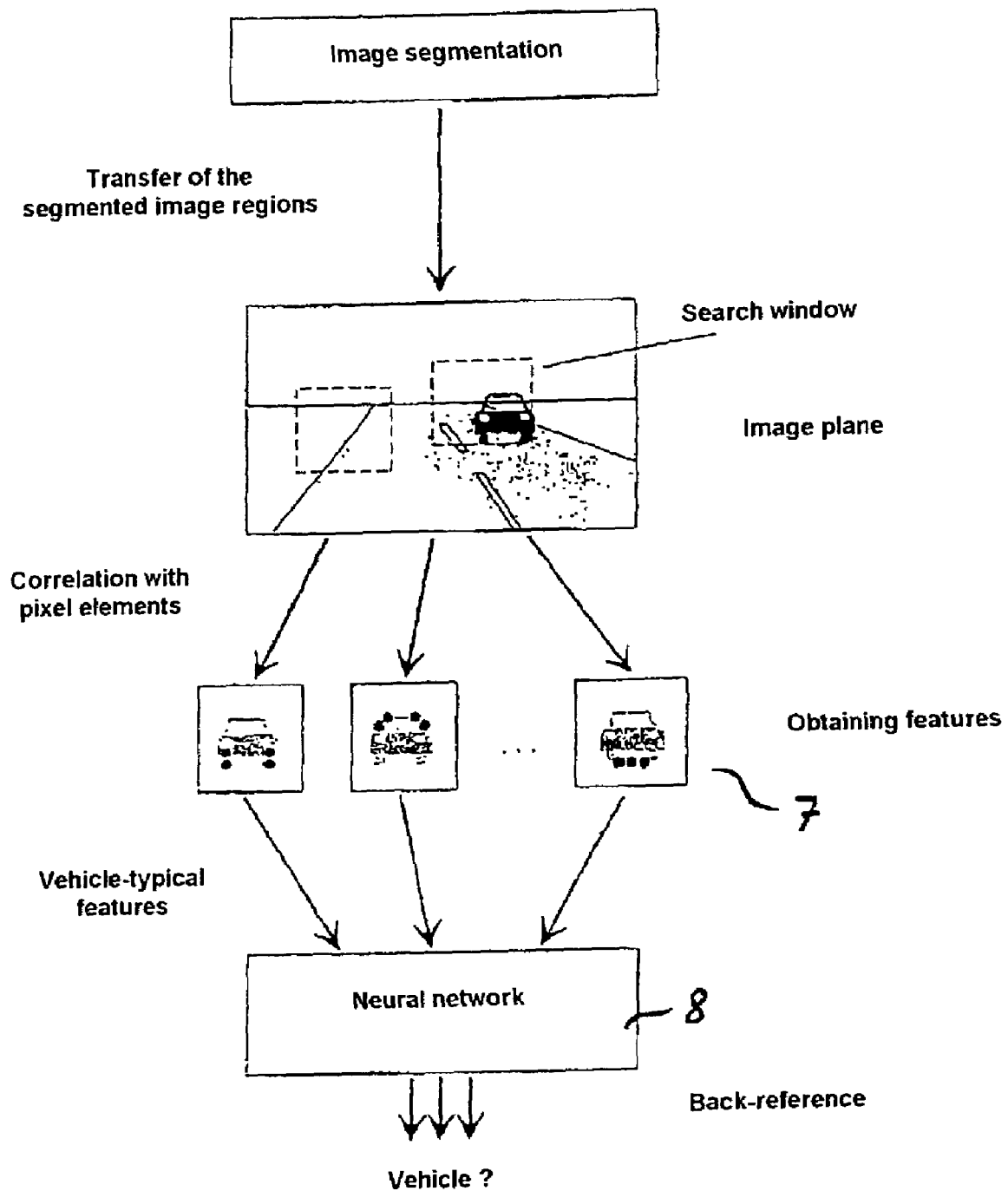
FIG. 4 shows a schematic representation to clarify the principle of the 2D feature extraction in the case of evaluation by a neural network according to the invention.

Road vehicles have significant features in the image plane, for example edges and corners, as well as symmetry. These features have been determined empirically for the purpose of a search, and the recognition of road vehicles is carried out by means of direct comparison with a vehicle model. In the method shown here, a search is made in accordance with statistically verified 2D features 7, which are subsequently compared with the internal model depiction of vehicles from a neural network 8. FIG. 4 shows a schematic representation to clarify the principle of the 2D feature extraction during evaluation by a neural network.

In order to determine significant and statistically verified 2D features 7 of road vehicles, a data set of 50 images, which show cars in various scenes, was used as a basis. By using the method explained below, a determination of a plurality of 9×9 large typical patterns, which often occur in the scenes used, was carried out (referred to below as comparative patterns).

The comparative patterns typically occur at specific locations on the vehicle. For example, the features may occur in the lower region of the vehicles. At these locations, most road vehicles exhibit similar structural areas. These are, for example, the shadows under the car and the corners of the tires, as well as the course of the structural areas at the head lamps.

Figure 5:
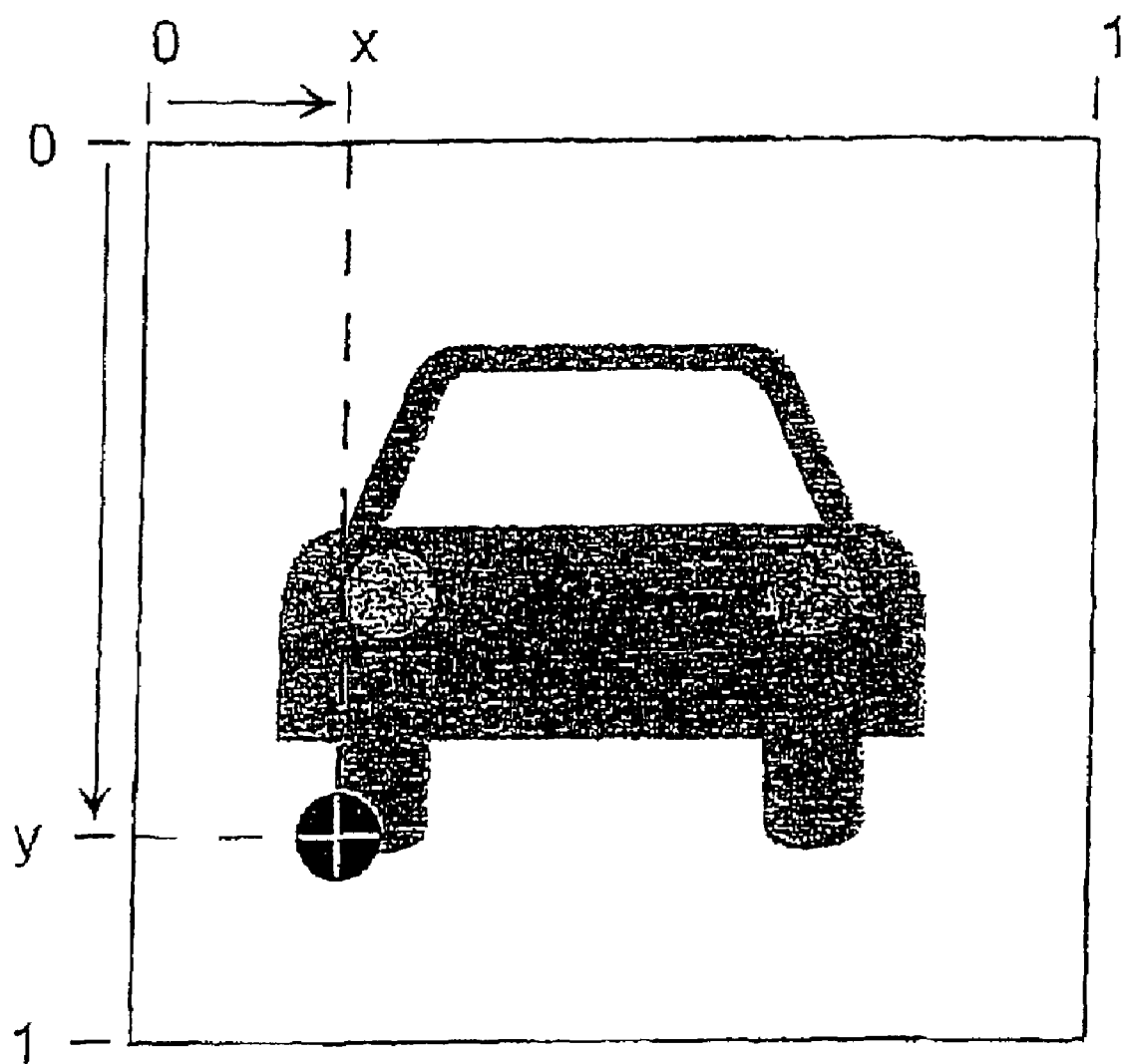
FIG. 5 shows a schematic representation to clarify the principle of coordinate normalization.

In the segmented image regions, a search window is defined in order to calculate the features determined by means of the predefined comparative patterns. Depending on the distance of the hypothetical object, a search window of matched size is defined and correlated with the comparative patterns. The locations in the search window which exhibit a local maximum of the correlation function identify significant features, as FIG. 5 shows.

The coordinates of the extrema and the associated comparison patterns provide the input features for the feed forward network used. This has been trained for the occurrence of typical combinations of features which identify vehicles.

Figure 6:
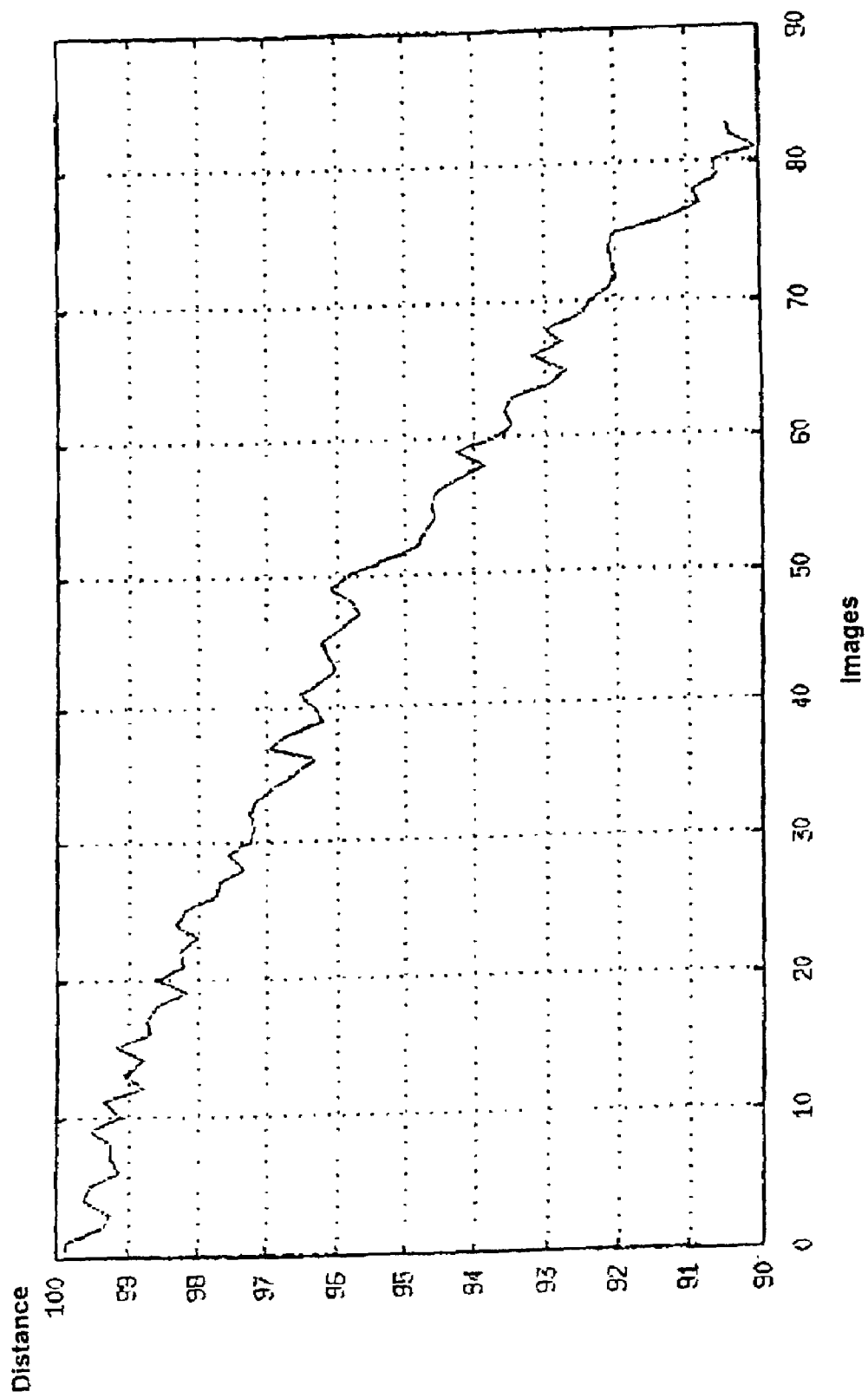
FIG. 6 shows a representation of a distance profile of an approaching vehicle.

The real-time method according to the invention for the stereo-based tracking of objects at a considerable distance has been tried performed in real road scenes. FIG. 6 represents the measured distance data from an approaching vehicle. As can be seen in FIG. 6, a measurement inaccuracy of about ±50 cm occurs at 100 meters distance.

In order to keep the determined distance data free of noise and largely free of measurement errors on account of erroneously determined correspondences, the use of a Kalman filter is suggested, which supplies more meaningful results as a result of the consideration of the measured values over time. By extending the 2D feature extraction by texture dimensions and symmetry operations, further potential is provided for improving the method presented.

In summary, it is to be recorded that, by using the method according to the invention, reliable distance determination and recognition of objects, in particular of road vehicles in front of and/or behind a travelling vehicle is possible up to a considerable distance.

The invention claimed is:

1. A method of detecting objects in a vicinity of a road vehicle up to a considerable distance, in which a distance from a moving or stationary vehicle to one or more objects is calculated by distance-based image segmentation using stereo image processing, and characteristics of the detected objects are determined by object recognition in the segmented image regions, the method comprising the acts of:
   determining image regions of elevated objects and/or flat objects;
   detecting elevated objects and/or flat objects by combining 3D points in accordance with predetermined criteria, the elevated objects being determined through features with similar distance values and the flat objects being determined through features with similar height values;
   tracking over time relevant detected objects and determining the distance and lateral position of the relevant detected objects relative to the road vehicle in order to assess dynamic behavior of the relevant detected objects;
   determining object hypothesis for performing object recognition, said object hypothesis being verified by comparison with object models;
   scanning segmented image regions in accordance with predetermined, statistically verified 2D features of particular relevant detected objects to be
   comparing the particular relevant detected objects using a neural network for classifying a specific object type;
   scanning one of recorded pairs of stereo images for significant features of objects to be registered; and
   determining a spacing of at least one object's significant features by comparing respective features in a stereo image from a pair of stereo images with the same, corresponding features, in the other stereo image from the pair of stereo images recorded at the same time;
   wherein disparities that occur are evaluated via cross correlation techniques.

2. The method according to claim 1, wherein elevated relevant detected objects are road vehicles and flat relevant detected objects are road markings and boundaries.

3. The method according to claim 2, further comprising the act of determining a relative position and a relative speed of the relevant detected objects relative to one another and to the road vehicle by evaluating a distance measurement, in order to determine an accurate road-lane object association.

4. The method according to claim 3, wherein the relative position and the relative speed of the relevant detected objects are determined in order to assess a relevance of the detected objects to a particular situation.

5. The method according to claim 1, further comprising the act of determining a relative position and a relative speed of the relevant detected objects relative to one another and to the road vehicle by evaluating a distance measurement, in order to determine an accurate road-lane object association.

6. The method according to claim 5, wherein the relative position and the relative speed of the relevant detected objects are determined in order to assess a relevance of the detected objects to a particular situation.

7. The method according to claim 1, wherein by determining the spacing of the significant features in a pixel range, 3D points in the road vehicle environment are determined relative to a coordinate system of a measuring device performing the detecting method.

8. The method according to claim 1, wherein said objects are detected by at least one of radar, infrared sensing, and stereoscopic or mono sensing.

9. A method of detecting and recognizing an object in a vicinity of a road vehicle, the method comprising the acts of:
   performing distance-based image segmentation to calculate a distance from the road vehicle to an object to be detected;
   scanning the segmented image regions in accordance with predetermined, statistically verified 2D features of the object to be detected;
   comparing the detected object using a neural network for classifying it as a specific object type,
   scanning one of recorded pairs of stereo images for significant features of objects to be registered; and
   determining a spacing of at least one object's significant features by comparing respective features in a stereo image from a pair of stereo images with the same, corresponding features, in the other stereo image from the pair of stereo images recorded at the same time;
   wherein disparities that occur are evaluated via cross correlation techniques.

* * * * *